United States Patent
Vendely et al.

(10) Patent No.: US 6,561,541 B2
(45) Date of Patent: May 13, 2003

(54) SIDE AIR BAG INCORPORATING INVERTED T-SHAPED FLOW BARRIER

(75) Inventors: Michael Joseph Vendely, Kettering, OH (US); John Anthony Lotspih, Englewood, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/903,133

(22) Filed: Jul. 11, 2001

(65) Prior Publication Data

US 2003/0011176 A1 Jan. 16, 2003

(51) Int. Cl.⁷ .............................................. B60R 21/22
(52) U.S. Cl. ............................... 280/730.2; 280/743.1
(58) Field of Search ........................ 280/730.1, 730.2, 280/743.1

(56) References Cited

U.S. PATENT DOCUMENTS

| | | | |
|---|---|---|---|
| 5,718,450 A | 2/1998 | Hurford et al. | 280/730.2 |
| 5,803,486 A | 9/1998 | Spencer et al. | 280/728.2 |
| 5,895,070 A | 4/1999 | Crimmins et al. | 280/730.2 |
| 6,010,149 A * | 1/2000 | Riedel et al. | 280/729 |
| 6,056,316 A * | 5/2000 | Yamaji et al. | 280/730.1 |
| 6,135,493 A * | 10/2000 | Jost et al. | 280/730.2 |
| 6,155,596 A * | 12/2000 | Nakajima et al. | 280/730.2 |
| 6,168,191 B1 * | 1/2001 | Webber et al. | 280/730.2 |
| 6,170,860 B1 * | 1/2001 | Denz et al. | 280/729 |
| 6,199,898 B1 * | 3/2001 | Masuda et al. | 280/729 |
| 6,224,091 B1 * | 5/2001 | Eyrainer et al. | 280/730.2 |
| 6,237,937 B1 * | 5/2001 | Kokeguchi et al. | 280/730.2 |
| 6,244,619 B1 * | 6/2001 | Satzger | 280/730.2 |
| 6,338,498 B1 * | 1/2002 | Niederman et al. | 280/728.2 |
| 6,349,964 B1 * | 2/2002 | Acker et al. | 280/730.1 |
| 6,382,669 B2 * | 5/2002 | Tanabe et al. | 280/743.1 |
| 6,398,254 B2 * | 6/2002 | David et al. | 280/730.2 |

* cited by examiner

Primary Examiner—Paul N. Dickson
Assistant Examiner—Deanne Draper
(74) Attorney, Agent, or Firm—Kathryn A. Marra

(57) ABSTRACT

A side impact air bag cushion which incorporates a flow barrier of inverted T-Shaped geometry at the interior. The flow barrier which may be in the form of a zero length tether includes a base portion and a leg portion extending away from the base portion. The base portion provides a partial barrier between the thorax protection portion of the air bag cushion and the head protection portion. The structure promotes desirable early inflation of the thorax protection portion of the air bag cushion as well as the substantially vertical inflated orientation of the head protection portion.

22 Claims, 3 Drawing Sheets

SIDE AIR BAG INCORPORATING INVERTED T-SHAPED FLOW BARRIER

TECHNICAL FIELD

This invention relates to a vehicle air bag assembly, and more particularly to an air bag cushion including a flow barrier element of substantially inverted T-shaped geometry disposed at the interior of the air bag for the dispersal of inflation gas into connected portions of the cushion for protection of the thorax and head of a vehicle occupant during a side collision event.

BACKGROUND OF THE INVENTION

It is well known in motor vehicles to provide an air bag assembly for the protection of a vehicle occupant. Such air bag assemblies typically include an inflatable cushion structure in fluid communication with a gas emitting inflator. Upon the occurrence of predetermined vehicle conditions, such as deceleration exceeding a certain level, a signal is sent via appropriate sensors to the gas emitting inflator thereby causing the inflator to discharge gas into the air bag cushion forcing the air bag cushion outwardly from a stored position into an operative position between the occupant to be protected and the interior portions of the vehicle. The presence of the inflated air bag cushion between the occupant and the interior portions of the vehicle provides a cushioning effect as the occupant impacts the inflated cushion thereby dissipating the kinetic energy of the occupant in a substantially controlled manner.

It is also known to provide an air bag assembly placed and configured for side impact protection of a vehicle occupant. The prior art has disclosed side impact air bag assemblies which have either one cushion or a plurality of cushions which deploy to protect the head and thorax portions of the vehicle occupant. In such side impact air bag assemblies, it may be desirable to promote early inflation of the thorax protection portion of the cushion rather than having inflation gas directed initially and preferentially to the head protection portion during the early stages of activation. At the same time, it may be desirable to deploy the head protection portion of the cushion to a substantially vertical orientation adjacent the occupant to be protected. Yet further, it may be desirable to inflate the side air bag cushion utilizing a relatively small volume of inflation gas without using excessive inflation gas to inflate regions of the air bag cushion unnecessarily.

It is known to utilize expansion limiting tether elements in the form of elongate straps across inflatable air bag structures to yield predetermined and desirable inflated geometries. However, the use of traditional tethering elements such as elongate straps and the like may substantially increase the complexity of the manufacturing process while adding mass and bulk to the finished product.

SUMMARY OF THE INVENTION

The present invention offers advantages and alternatives over the prior art by providing a side impact air bag cushion which incorporates an integral zero-length tether element which promotes desirable early inflation of the thorax protection portion of the cushion as well as the substantially vertical inflated orientation of the head protection portion while simultaneously reducing the total inflated volume of the cushion. Accordingly, the present invention is believed to provide a new and useful advancement over the prior art.

These advantages are accomplished in a potentially preferred form of the present invention by providing an air bag assembly in a vehicle having an inflator for generating inflation gas and an air bag cushion deployable upon generation of gas by the inflator. The air bag cushion includes an upper boundary and lateral sides extending away from the upper boundary. The air bag cushion includes a lower inflatable portion for cushioning the thorax of the vehicle occupant. The air bag cushion further includes a substantially contiguous upper inflatable portion distal from the inflator for cushioning the head of the vehicle occupant. A flow blocking element in the form of a zero-length tether having a substantially inverted T-shaped configuration is disposed at the interior of the air bag cushion adjoining opposing interior surfaces of the air bag cushion so as to restrict gas flow between portions of the cushion at the location of the zero-length tether. The base portion of the zero-length tether is oriented in substantially transverse relation to the lateral sides at a latitude along the air bag cushion between the upper and lower inflatable portions so as to establish a boundary between the head protection portion and the thorax protection portion of the cushion. The substantially vertical leg portion of the zero-length tether extends away from the base and into the head protection portion of the cushion thereby stabilizing the head protection portion upon inflation. Advantageously, the air bag cushion of the present invention may be constructed utilizing cost effective and highly efficient seaming or other surface connecting procedures without relying on separate tethering elements.

According to one aspect of the present invention, the air bag cushion may be formed from a single piece of material by folding such a piece of material upon itself along a predetermined fold line to form a folded structure of two layers and applying at least one perimeter seam around the perimeter of the folded structure to define a gas receiving enclosure. A flow barrier element in the form of a zero-length tether is applied at an interior position within the perimeter boundaries of the folded structure so as to join the two layers together at the location of the zero-length tether. The geometry of the flow barrier element is substantially in the form of an inverted T-shaped geometry including a substantially horizontal base and a substantially vertical leg projecting upwardly away from the base portion. The substantially horizontal base is preferably disposed at a latitude substantially corresponding to the boundary between the portion of the air bag cushion deployable adjacent to the thorax of an occupant to be protected and the portion of the air bag cushion deployable adjacent to the head of the occupant to be protected. The zero-length tether making up the flow barrier element may be introduced by sewing together the opposing surfaces of the air bag cushion as well as by other means including welding or adhesively bonding together the layers of the folded structure. The zero-length tether may be applied at the time that the connective perimeter seams are applied and may be of structurally similar character to such connective perimeter seams thereby simplifying the construction process. The base and leg portions of the flow barrier element may be interconnected or separate from one another.

The structure of the air bag cushion according to the present invention is such that inflation gas entering the air bag cushion is channeled around the base of the flow barrier element before entering the head protection portion of the air bag cushion. The base of the flow barrier element restricts the flow path from the thorax protection portion and into the head protection portion thereby promoting early preferential expansion of the thorax protection portion of the air bag cushion. Upon inflation of the head protection portion, the vertical leg of the flow barrier element separates the head portion of the cushion into vertical sections and promotes the stable vertical orientation of the head protection portion relative to the head of the occupant to be protected.

BRIEF DESCRIPTION OF THE DRAWINGS

The present invention will now be described by way of example only, with reference to the accompanying drawings which constitute a part of the specification herein and in which.

DESCRIPTION OF THE PREFERRED EMBODIMENT

Figure 1:
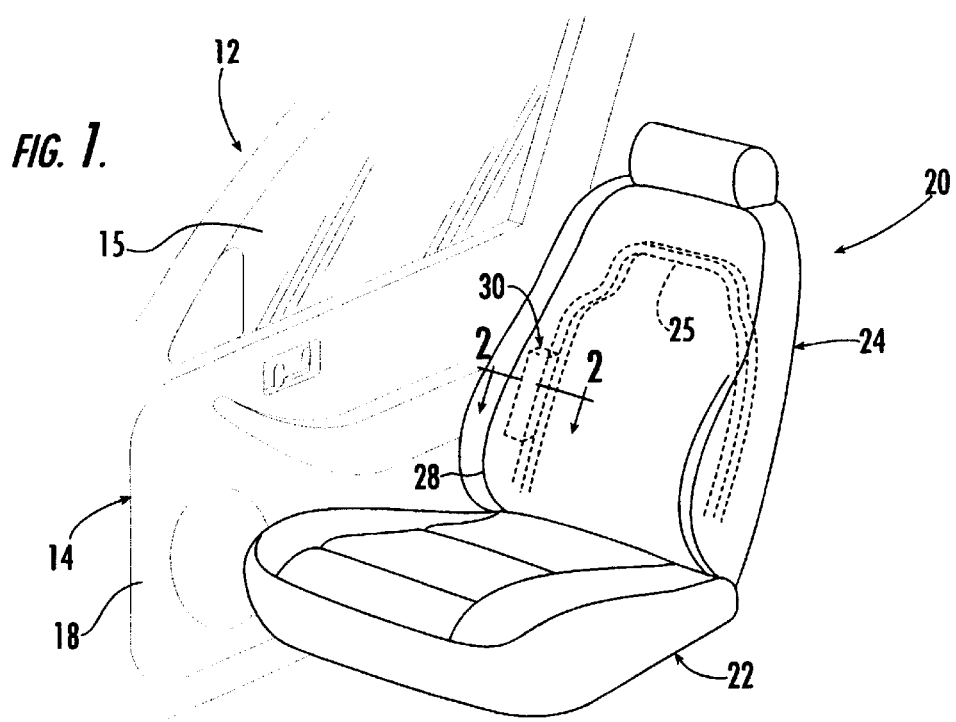
FIG. 1 is a perspective view of a vehicle interior partially broken away and including a side air bag assembly in an undeployed state located in a vehicle seat.
Figure 2:
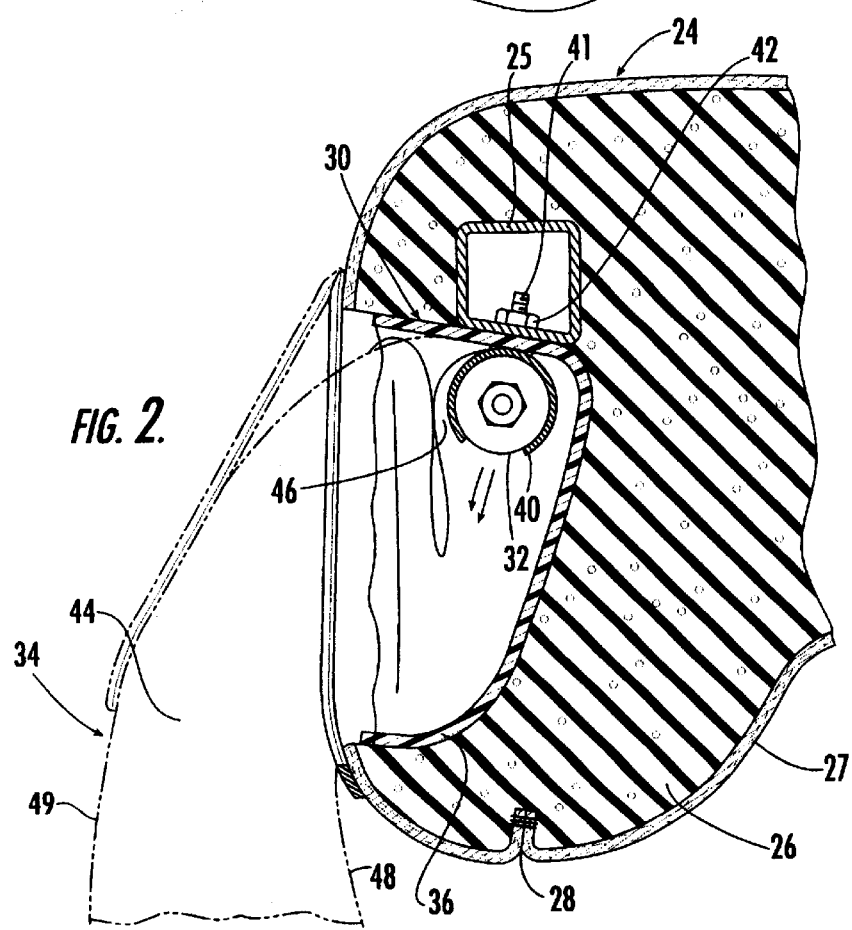
FIG. 2 is a section view taken along line 2—2 of FIG. 1 and showing the air bag module in an undeployed condition in solid lines and illustrating the air bag cushion in the deployed condition in phantom lines.

Referring now to the drawings, it is seen in FIG. 1 that a vehicle 12 includes a door 14 having a movable window 15 mounted thereon. The interior of the vehicle 12 includes an inner door panel 18 and a seat 20 for the support of the vehicle occupant (not shown). The seat 20 includes a bottom portion 22 and an upwardly extending back portion 24. The back portion 24 includes a rigid seat frame 25 which is preferably made of metal, and encompassed within the back portion 24. As shown in FIG. 2, the back portion 24 is preferably formed of a foam material 26 covered by a fabric or leather seat material 27. The back portion 24 preferably includes a generally vertically extending seat seam 28 adjacent the inner door panel 18.

As illustrated in FIG. 2, the component parts an air bag module are preferably located within the back portion 24 of the seat 20. However, it will be appreciated that the air bag module may alternatively be mounted anywhere in the vehicle 12. In this regard, it is contemplated that the air bag module 30 may be especially well adapted to be mounted in various alternative locations within the door 14 or seat bottom 22. According to arrangements as will be well known to those of skill in the art.

As illustrated, the air bag module 30 preferably includes an inflator 32, an air bag cushion 34 for inflation upon the discharge of inflating gas by the inflator 32, a housing 36 for containment of the inflator 32 and air bag cushion 34 therein, and a mounting bracket 40 for attachment of the air bag cushion 34 and inflator 32 to the seat frame 25 by appropriate fastening devices such as a bolt 41 and cooperatively attached nut 42 in the manner illustrated. One such bracket assembly as may be utilized is illustrated and described in U.S. Pat. No. 5,803,486 to Spencer et al. issued Sep. 8, 1998, the teachings of which are incorporated herein by reference. However, other appropriate attachment mechanisms as may be known to those of skill in the art may likewise be utilized. As will be appreciated, the housing 36 may be eliminated in so called "soft pack" arrangements if desired.

The inflator 32 may be of any suitable construction which discharges a gaseous inflation medium upon the occurrence of predetermined conditions experienced by the vehicle 12. Such vehicle conditions typically relate to rapid vehicle deceleration as monitored by appropriate sensors (not shown) as will be well known to those of skill in the art.

The air bag cushion 34 according to the present invention may be made of any suitably material although a textile material of woven or knitted yarns may be preferred. According to a potentially preferred embodiment, the material forming the air bag cushion 34 is a woven textile formed from nylon or polyester filament yarns wherein such yarns have a linear density in the range of about 105 denier to about 840 denier and wherein the filaments which make up such yarns are characterized by a linear density of about 3 to about 6 denier per filament. It is believed that such textile structures may provide advantages in packing the air bag cushion 34 within the confine of the housing 36. The material forming the air bag cushion 34 will most preferably be a woven textile structure formed from nylon yarns according to a so called "rip-stop" weave pattern although other constructions and materials as may be known to those of skill in the art are also contemplated.

Figure 3:
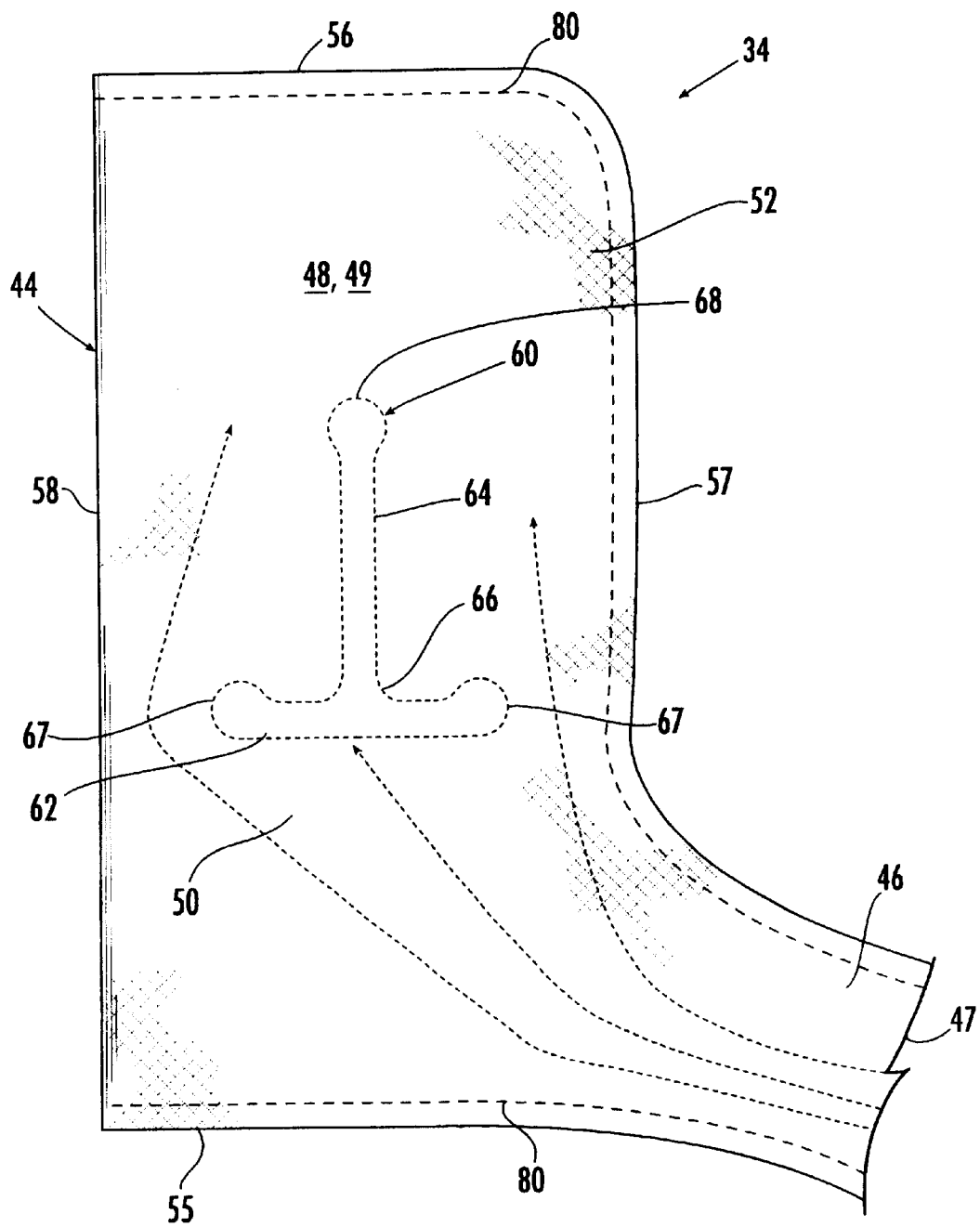
FIG. 3 is a plan view of an air bag cushion according to the present invention including an expansion restraining inverted T-shaped flow barrier element in the form of a zero-length tether.

As best shown through reference to FIGS. 2 and 3, the air bag cushion 34 includes a main body portion 44 which is inflatable upon the discharge of the inflator gas as shown in phantom lines in FIG. 2. The air bag cushion 34 may also include a neck portion 46 which is preferably an extension of the material forming the main body portion 44. As illustrated, the neck portion 46 terminates in a mouth opening 47 which may be disposed in substantially surrounding relation to the inflator 32 such that the path of travel of the inflation gas is through the neck portion 46 and into the main body portion 44 as shown by the directional arrows in FIG. 3.

As shown in FIG. 2, the main body portion 44 is bounded by an occupant impact surface 48 deployed adjacent to the occupant and a substantially opposing door impact surface 49. If desired, at least portions of the of the air bag cushion 34 may be coated with a permeability blocking composition such as silicon, acrylic, urethane, polyamide dispersions and combinations thereof. Such coatings are preferably disposed across the interior of the air bag cushion 34. Alternatively, the air bag cushion 34 may be substantially uncoated if desired.

As illustrated, the air bag cushion 34 preferably comprises an inflatable chamber bounded between the occupant impact surface 48 and the opposing door impact surface 49 and enclosed along a lower boundary 55, an upper boundary 56, a first lateral side 57 and a second lateral side 58. In order to provide protection to both the thorax and the head of the occupant, the air bag cushion 34 is preferably of a generally elongate configuration such that upon inflation the air bag cushion 34 expands substantially adjacent to the occupant to be protected in a generally vertical orientation within the space between the door panel 18 and the seat 20. According to the illustrated and potentially preferred embodiment, the air bag cushion 34 includes a thorax protection portion 50 for inflated deployment adjacent the thorax of the occupant to be protected and a head protection portion 52 for deployment adjacent the head of the vehicle occupant.

According to the illustrated embodiment, the cushion 34 includes a flow barrier element 60 in the form of a zero-length tether interconnecting the occupant impact surface 48 and the door impact surface 49 of the air bag cushion 34 intermediate the first and second lateral sides 57, 58. As shown, the flow barrier element 60 is preferably of a substantially inverted T-shaped geometry including a substantially horizontal base portion 62 arranged centrally so as to partially span the distance between the first lateral side 57 and the second lateral side 58. As illustrated, the flow barrier element 60 also preferably includes a substantially vertical leg portion 64 extending in normal relation away from the base portion 62. According to the potentially preferred embodiment, the base portion 62 and the leg portion 64 are interconnected with one another so as to form a substantially unitary structure. However, it is likewise contemplated that there may be some degree of separation between the base portion 62 and the leg portion 64 if desired.

The base portion 62 of the flow barrier element 60 is preferably located at a position along the height of the air bag cushion substantially corresponding to the boundary between the thorax protection portion 50 adjacent the thorax of the occupant and the head protection portion 52. Accordingly, the leg portion 64 preferably extends into the head protection portion 52 of the air bag cushion 34.

In operation, as the inflation gas enters the air bag cushion 34 inflation is initiated within the lower thorax protection portion 50. Due to the presence of the base portion 62 of the flow barrier element 60 across the air bag cushion 34 the inflation gas is partially restricted against early conveyance into the upper head protection portion 52. By restricting the flow rate of inflation gas into the head protection portion 52, the thorax protection portion 50 is enabled to achieve substantially complete operational expansion at an early stage of deployment. Thus, the lower thorax protection portion 50 achieves full inflation slightly earlier than the upper head protection portion 52. As will be appreciated, this sequence of inflation substantially corresponds to the typical sequence of impact events between the air bag cushion 34 and the occupant to be protected wherein the thorax and thereafter the head of the occupant come into contact with the air bag cushion 34 at slightly different times. In addition to the benefit of staged inflation provided by the base portion 62 of the flow barrier element 60, the leg portion 64 also provides post inflation benefit by promoting a substantially stiff vertical orientation of the head protection portion 52 once inflation is complete.

Figure 4:
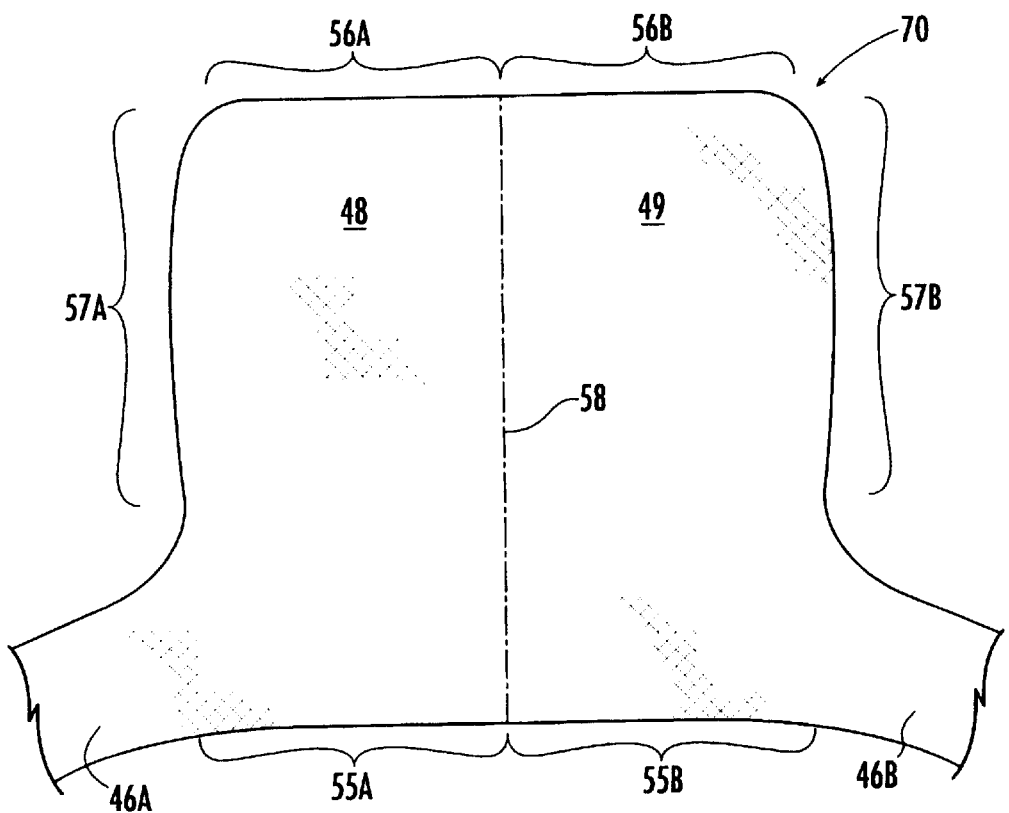
FIG. 4 is a plan view of a material blank for formation of one embodiment of an air bag cushion according to the present invention having a one piece structure; and While the invention has been illustrated and generally described above and will hereinafter be described in detail in connection with certain potentially preferred embodiments and practices, it is to be understood that the foregoing general description as well as the following detailed description and accompanying drawings are exemplary and explanatory only and in no event is the invention intended to be limited thereby. On the contrary, it is intended that the present invention shall extend to all alternatives, modifications and equivalents as may embrace the broad principles of this invention within the true spirit and scope thereof.

According to a potentially preferred aspect of the present invention, it is contemplated that the formation of the air bag cushion 34 and the introduction of the flow barrier element 60 may be carried out by highly efficient folding and seaming procedures using either multiple blanks of material or a single blank of material. A single piece material blank useful in forming the air bag cushion 34 is shown in FIG. 4. As shown, the single piece blank of material is preferably of a substantially symmetrical configuration such that it may be folded along a center line corresponding to the second lateral side 58 of the cushion to yield a structure substantially as illustrated in FIG. 3. Upon executing such a folding operation, connective seams 80 are introduced between corresponding edge segments 55A, 55B; 56A, 56B; 57A, 57B around the perimeter of the folded structure. As shown, the mouth opening 47 is preferably permitted to remain open so as to permit the introduction of inflation gas from the inflator 32.

The connective perimeter seams 80 may be formed by any suitable means including, by way of example only, and not limitation industrial sewing, RF welding, ultrasonic welding, adhesive bonding, and combinations thereof. Of course, it is to be appreciated that the air bag cushion 34 may likewise be formed from two or more separate panels of material attached together in the desired geometry. By way of example only, one such multi-piece embodiment may utilize two substantially identical panels corresponding to each half of the material blank 70 as shown in FIG. 3.

It is contemplated that the flow barrier element 60 including the substantially horizontal base portion 62 and substantially vertical leg portion 64 may be introduced substantially contemporaneously with the introduction of the connective perimeter seams 80 in the form of zero-length tethers interconnecting the opposing surfaces 48, 49 of the air bag cushion 34 at the location of such zero-length tethers. Thus, it is contemplated that no additional structural elements may be required to form the flow barrier element 60 within the air bag cushion 34.

According to the potentially preferred practice, the zero-length tethers forming the flow barrier element 60 are preferably introduced using the same connective procedures as may be used to apply the connective perimeter seams. By way of example only, such procedures may include industrial sewing, RF welding, ultrasonic welding, adhesive bonding and combinations thereof. However, it is also contemplated that the flow barrier element constituents may be of different character from the connective perimeter seams 80 if desired. It is also contemplated that the flow barrier element 60 may be formed by structures other than zero-length tethers including by way of example only, internal webs and the like.

According to one potentially preferred embodiment the flow barrier element 60 is of a substantially unitary construction wherein the leg portion 64 merges into the base portion 62 in the manner as shown in FIG. 3. According to the preferred practice, a force distributing curved transition zone 66 of substantially concave structure is present at the intersection between the base portion 62 and the leg portion 64 of the flow barrier element 60 so as to avoid undue force concentration at the intersection while nonetheless maintaining a substantially right angled relationship between the base portion 62 and the leg portion 64. Likewise, the terminal ends 67 of the base portion 62 and the terminal end 68 of the leg portion 64 are preferably of a substantially high radius rounded configuration so as to avoid potentially undesirable force concentration at those locations.

While the present invention has been illustrated and described in relation to potentially preferred embodiments, constructions and procedures, it is to be understood and appreciated that such embodiments, constructions and procedures are illustrative and exemplary only and that the present invention is in no event to be limited thereto. Rather, it is contemplated that modifications and the variations embodying the principles of the present invention will no doubt occur to those of skill in the art to which the invention pertains. It is therefore contemplated and intended that the present invention shall extend to all such modifications and variations as may incorporate the broad aspects of the present invention within the full spirit and scope thereof.

What is claimed is:

1. An inflatable air bag cushion for expansion within a transportation vehicle in side relation to a vehicle occupant upon introduction of inflation gas from a gas emitting inflator, the air bag cushion comprising:
    a mouth opening for fluid communication with the inflator; and
    an inflatable body comprising a pair of substantially opposing surfaces, wherein the inflatable body includes a thorax protection portion and a head protection portion in fluid communication with the thorax protection portion, the thorax protection portion being disposed intermediate the mouth opening and the head protection portion such that upon introduction of inflation gas from the inflator, at least a portion of the inflation gas travels through the thorax protection portion and into the head protection portion and wherein the inflatable body includes a gas blocking barrier structure having a substantially inverted T-shaped geometry adjoining the pair of substantially opposing surfaces across the inflatable body such that upon introduction of the inflation gas from the inflator, the gas blocking barrier structure partially blocks the flow of inflation gas from the thorax protection portion into the head protection portion.

2. The air bag cushion according to claim 1, wherein the gas blocking barrier structure comprises a zero length tether disposed between the pair of substantially opposing surfaces.

3. The air bag cushion according to claim 2, wherein the gas blocking barrier structure includes a base portion and a leg portion and wherein the base portion is disposed between the head protection portion and the thorax protection portion such that the leg portion extends away from the base portion and into the head protection portion.

4. The air bag cushion according to claim 3, wherein the leg portion intersects the base portion.

5. The air bag cushion according to claim 4, wherein the leg portion and the base portion are disposed at substantially right angles relative to one another.

6. The air bag cushion according to claim 4, wherein the leg portion is integral with the base portion and wherein a force distributing curved transition zone is disposed between the leg portion and the base portion.

7. The air bag cushion according to claim 6, wherein the base portion includes substantially rounded terminal ends.

8. The air bag cushion according to claim 6, wherein the leg portion includes a substantially rounded terminal end projecting away from the base portion.

9. The air bag cushion according to claim 6, wherein the base portion includes substantially rounded terminal ends and wherein the leg portion includes a substantially rounded terminal end projecting away from the base portion.

10. The inflatable air bag cushion as recited in claim 1, wherein the inflatable body is of a single piece construction.

11. An inflatable air bag cushion for expansion within a transportation vehicle in side relation to a vehicle occupant upon introduction of inflation gas from a gas emitting inflator, the air bag cushion comprising:
    a mouth opening for fluid communication with the inflator; and
    an inflatable body comprising an upper boundary distal from the mouth opening, a pair of substantially opposing lateral sides extending away from the upper boundary and a pair of substantially opposing surfaces disposed between the lateral sides, wherein the inflatable body includes a thorax protection portion for inflated deployment adjacent the thorax of the occupant and a head protection portion in fluid communication with the thorax protection portion for inflated deployment adjacent the head of the occupant, the thorax protection portion being disposed at a height below the head protection portion intermediate the mouth opening and the head protection portion such that upon introduction of inflation gas from the inflator, at least a portion of the inflation gas travels through the thorax protection portion and into the head protection portion and wherein the inflatable body includes a gas blocking barrier structure having a substantially inverted T-shaped geometry adjoining the pair of substantially opposing surfaces across the inflatable body, the gas blocking barrier structure including an elongate base portion including a pair of opposing terminal ends each projecting towards one of the lateral sides and an elongate leg portion extending away from the base portion towards the upper boundary, the base portion being disposed substantially between the head protection portion and the thorax protection portion such that upon introduction of the inflation gas from the inflator, the base portion partially blocks the flow of inflation gas from the thorax protection portion into the head protection portion.

12. The air bag cushion according to claim 11 wherein the gas blocking barrier structure comprises a zero length tether disposed between the pair of substantially opposing surfaces.

13. The air bag cushion according to claim 11, wherein the leg portion intersects the base portion.

14. The air bag cushion according to claim 11, wherein the leg portion is integral with the base portion and wherein a force distributing curved transition zone is disposed between the leg portion and the base portion.

15. The air bag cushion according to claim 14, wherein the terminal ends of the base portion are substantially rounded.

16. The air bag cushion according to claim 14, wherein the leg portion includes a substantially rounded terminal end projecting towards the upper boundary.

17. The air bag cushion according to claim 14, wherein the base portion includes substantially rounded terminal ends and wherein the leg portion includes a substantially rounded terminal end projecting towards the upper boundary.

18. The air bag cushion according to claim 11, wherein the terminal ends of the base portion are remote from the lateral sides such that a flow channel is present between the base portion and the lateral sides for conveyance of inflation gas between the thorax protection portion and the head protection portion.

19. The air bag cushion according to claim 11, wherein the leg portion includes a terminal end disposed within the head protection portion at a position remote from the upper boundary.

20. The inflatable air bag cushion as recited in claim 11, wherein the inflatable body is of a single piece construction.

21. An inflatable air bag cushion for expansion within a transportation vehicle in side relation to a vehicle occupant upon introduction of inflation gas from a gas emitting inflator, the air bag cushion comprising:
    a mouth opening for fluid communication with the inflator; and
    an inflatable body enclosed by at least one perimeter seam and including an upper boundary distal from the mouth opening, lateral sides extending away from the upper boundary and a pair of substantially opposing surfaces disposed between the lateral sides, wherein the inflatable body includes a thorax protection portion for inflated deployment adjacent the thorax of the occupant and a head protection portion in fluid communication with the thorax protection portion for inflated deployment adjacent the head of the occupant, the thorax protection portion being disposed intermediate the mouth opening and the head protection portion such that upon introduction of inflation gas from the inflator, at least a portion of the inflation gas travels through the thorax protection portion and into the head protection portion and wherein the inflatable body includes a gas blocking barrier structure having a substantially inverted T-shaped geometry and comprising at least one zero length tether adjoining the opposing surfaces across the inflatable body, the gas blocking barrier structure including an elongate base portion including opposing terminal ends projecting towards opposing lateral sides and an elongate leg portion extending away from the base portion towards the upper boundary, the base portion being disposed substantially between the head protection portion and the thorax protection portion such that upon introduction of the inflation gas from the inflator, the base portion partially blocks the flow of inflation gas from the thorax protection portion into the head protection portion and the leg portion adjoins the substantially opposing surfaces within the head protection portion.

22. The inflatable air bag cushion as recited in claim 21, wherein the inflatable body is of a single piece construction.

* * * * *